United States Patent
Knoll et al.

(10) Patent No.: US 9,629,207 B2
(45) Date of Patent: Apr. 18, 2017

(54) SOLID STATE LAMP CONTROL

(71) Applicant: Dialog Semiconductor Inc., Campbell, CA (US)

(72) Inventors: Clarita Knoll, San Leandro, CA (US); Xiaoyan Wang, Milpitas, CA (US); Nan Shi, Newark, CA (US); Guang Feng, Cupertino, CA (US); Haiju Li, Fremont, CA (US)

(73) Assignee: Dialog Semiconductor Inc., Campbell, CA (US)

( * ) Notice: Subject to any disclaimer, the term of this patent is extended or adjusted under 35 U.S.C. 154(b) by 71 days.

(21) Appl. No.: 14/486,195

(22) Filed: Sep. 15, 2014

(65) Prior Publication Data
US 2016/0081149 A1 Mar. 17, 2016

(51) Int. Cl.
*H05B 33/08* (2006.01)

(52) U.S. Cl.
CPC ........ *H05B 33/0815* (2013.01); *Y02B 20/346* (2013.01)

(58) Field of Classification Search
CPC combination set(s) only.
See application file for complete search history.

(56) References Cited

U.S. PATENT DOCUMENTS

2011/0266968 A1 11/2011 Bordin et al.
2014/0239840 A1 8/2014 Wang et al.

FOREIGN PATENT DOCUMENTS

WO WO 2013/114242 8/2013

OTHER PUBLICATIONS

German Office Action 10 2015 200 365.5, Jun. 5, 2015, Dialog Semiconductor Inc.

*Primary Examiner* — Douglas W Owens
*Assistant Examiner* — Jianzi Chen
(74) *Attorney, Agent, or Firm* — Saile Ackerman LLC; Stephen B. Ackerman

(57) ABSTRACT

Intelligent control of a solid state lamp when coupled to a trailing edge phase cut dimmer switch is provided. On and off cycles of the lamp's power stage switch are enabled during a period when the energy in the bulk capacitor is at its highest levels. During this period a bleeder circuit does not have to be enabled, which results in a greater operational efficiency as compared with normal switching schemes for trailing edge dimmers.

16 Claims, 6 Drawing Sheets

SOLID STATE LAMP CONTROL

BACKGROUND

The present disclosure relates to solid state lamp control, and in particular to control of a solid state lamp when coupled to a trailing edge phase cut dimmer.

Solid state lamps, such as Light emitting diode (LED) based lamps have become commonplace. As used herein, a "lamp" may also be referred to as a "light bulb". As shown in FIG. 1, in a solid state lighting system a solid state lamp (SSL) 102 may be connected to an AC mains supply 102 via a phase cut dimmer switch 104.

Phase cut dimmer switches comprise a phase cut switching element that operates to disconnect the AC mains from the lamp at a given phase angle of every AC half cycle. The amount of phase cut (portion of the AC half wave that is removed) can be adjusted based on a dimming setting that is selected by an end user.

There are two types of phase cut dimmer switches that are typically in use, leading edge and trailing edge. In a leading edge phase cut dimmer switch, the phase cut starts at or just after a zero crossing point of the AC mains signal and is maintained until the AC mains signal reaches its set phase angle. In a trailing edge phase cut dimmer switch the AC mains signal is disconnected from the lamp at the set phase angle and until the next zero crossing of the AC mains signal.

A common phase cut switching element is a bidirectional triode thyristor, more commonly referred to as a triac. This is a switching device that can conduct current in either direction when it is triggered. However, once a triac has been switched on and settled it requires a minimum holding current in order to maintain its state. This means that the lamp must maintain a minimum load to ensure correct operation of the triac. If the minimum current threshold is not met, the triac device resets and prematurely goes to the off state, causing noticeable light flicker or complete failure.

However, in the case of LED-based lamps, maintaining a minimum load while the triac is in the conducting state is difficult, primarily due to the much greater operational efficiency of LED-based lamps.

Furthermore, the minimum holding current varies widely between triac devices. This further complicates the design of LED-based lamps, because the variation increases the risk that the lamps may be incompatible with certain dimmers.

In order to ensure the triac device remains in the on state as defined by the dimming setting, existing LED-based lamps contain what is commonly referred to as a bleeder circuit.

The bleeder circuit adds to the over-all load that the lamp draws from the AC mains, providing the necessary current to keep the triac device in the on state at the desired periods.

FIG. 2 shows an example of a prior art LED-based lamp comprising a DC voltage source, power stage, output stage, and bleeder. The topology of FIG. 2 is commonly referred to as a non-isolated buck-boost circuit. An input stage receives and rectifies an incoming AC voltage, in this case comprising a diode bridge DB1 and bulk capacitor C1 to provide an unregulated DC voltage source. Inductor L1, power switch S1 and controller U1 comprise a power stage. The power switch S1 may be a transistor. When the power stage is enabled, the power switch S1 switches on an off rapidly. Output regulation is provided by controller U1 controlling the ON and OFF cycles of power switch S1. An output stage comprises rectifier diode D1 and output capacitor C2. A light emitter LED1 is coupled to the regulated output. The light emitter may comprise an LED or an array of LEDs (a single LED is shown for clarity of illustration).

Ballast resistor R1, switch S3 and controller U2 comprise an example of a bleeder circuit. When it is determined that bleeder current is required in order to maintain the proper operation, U2 places S3 in to the ON state, creating a load current across the bulk capacitor through R1. Although this maintains proper operation of the dimmer switch, it is purely dissipative and reduces the operational efficiency of the lamp.

FIG. 3 shows typical operating waveforms of the prior art LED based lamp shown in FIG. 2 coupled to a leading edge phase cut dimmer switch. FIG. 3a plots voltage against time and shows the AC mains voltage waveform (dotted line) superimposed on the phase cut AC input waveform (solid line).

FIG. 3b shows the ON and OFF cycles of power switch S1 over time as controlled by the controller U1 to maintain output regulation. The controller U1 initiates the ON and OFF cycles after the triac of the dimmer switch starts to conduct. Once the correct amount of energy is delivered to the load (that is, the lamp), controller U1 stops the energy transfer to the load by suspending the ON and OFF cycles of S1. This is illustrated by the regulation threshold 300, which can be adjusted in order to maintain output regulation.

When the ON and OFF cycles of S1 are suspended, the load that the LED based lamp places on the AC input voltage is minimal, requiring the bleeder to be enabled for the reasons discussed above. As shown in FIG. 3c, controller U2 enables the bleeder circuit by placing S2 in the ON state when the switching cycles of S1 are disabled. The switching cycles of S1 occur when the energy stored in the bulk capacitor C1 is at a maximum.

FIG. 4 shows typical operating waveforms of the prior art LED based lamp shown in FIG. 2 coupled to a trailing edge phase cut dimmer switch. FIG. 4a plots voltage against time and shows the AC mains voltage waveform (dotted line) superimposed on the phase cut AC input waveform (solid line).

FIG. 4b shows the ON and OFF cycles of S1 over time as controlled by the controller U1 to maintain output regulation. The controller U1 initiates the ON and OFF cycles after the triac of the dimmer switch starts to conduct, which in the case of a trailing edge dimmer switch is at the zero crossing of the AC mains waveform. Once the correct amount of energy is delivered to the load controller U1 stops the energy transfer to the load by suspending the ON and OFF cycles of S1. This is illustrated by the regulation threshold 400, which can be adjusted in order to maintain output regulation.

When the ON and OFF cycles of S1 are suspended, the load that the LED based lamp places on the AC input voltage is minimal, requiring the bleeder to be enabled for the reasons discussed above. As shown in FIG. 4c, the controller U2 enables the bleeder circuit by placing S2 in the ON state when the switching cycles of S1 are disabled.

In contrast to the case of the leading edge dimmer, the bleeder is enabled when the amount of energy in the bulk capacitor is at its maximum. Since the energy dispensed by the bleeder circuit is purely dissipative, the operational efficiency of the lamp is greatly reduced.

SUMMARY OF THE DISCLOSURE

According to a first aspect of the disclosure there is provided a lamp for connection to an AC mains supply via a trailing edge phase cut dimmer switch and comprising:

an input stage;
an output stage including a solid state light source;
a power stage including a power switch for selectively
   coupling the power stage with the output stage;
a bleeder circuit including a load and a bleeder switch for
   selectively coupling a load with the input stage; and
a controller arranged to:
enable on and off switching cycles of the power switch
   throughout the course of a period that starts at a point
   of an AC mains supply cycle as determined by a
   regulation threshold and ends when the when the phase
   cut dimmer switch disconnects the AC mains from the
   lamp, wherein
the regulation threshold is determined by feedback from
   one or more previous AC half cycles.
Optionally, the controller is further arranged to enable the bleeder switch to couple the load with the input stage when on and off switching cycles of the power switch are disabled.

Optionally, the input stage comprises a diode bridge and bulk capacitor providing an unregulated DC source.

Optionally, the regulation threshold is adjustable by the controller.

Optionally, the end of the period is triggered by the AC mains supply voltage crossing a stop threshold Optionally, the controller comprises a first controller coupled with the power switch and a second controller coupled with the bleeder switch.

Optionally, the solid state light source comprises one or more light emitting diodes.

According to a second aspect of the disclosure there is provided a lighting system comprising a trailing edge phase cut dimmer and a lamp for connection to an AC mains supply via a trailing edge phase cut dimmer switch; said lamp comprising:
an input stage;
an output stage including a solid state light source;
a power stage including a power switch for selectively
   coupling the power stage with the output stage;
a bleeder circuit including a load and a bleeder switch for
   selectively coupling a load with the input stage; and
a controller arranged to:
enable on and off switching cycles of the power switch
   throughout the course of a period that starts at a point
   of an AC mains supply cycle as determined by a
   regulation threshold and ends when the when the phase
   cut dimmer switch disconnects the AC mains from the
   lamp, wherein
the regulation threshold is determined by feedback from
   one or more previous AC half cycles.

According to a third aspect of the disclosure there is provided a method of controlling a lamp comprising an input stage; an output stage including a solid state light source; a power stage including a power switch for selectively coupling the power stage with the output stage; a bleeder circuit including a load and a bleeder switch for selectively coupling a load with the input stage; said method comprising:
enabling on and off switching cycles of the power switch
   throughout the course of a period that starts at a point
   of an AC mains supply cycle as determined by a
   regulation threshold and ends when the when the phase
   cut dimmer switch disconnects the AC mains from the
   lamp; and
determining the regulation threshold based on feedback
   from one or more previous AC half cycles.
Optionally, the method further comprises enabling the bleeder switch to couple the load with the input stage when on and off switching cycles of the power switch are disabled.

Optionally, the input stage comprises a diode bridge and bulk capacitor and provides an unregulated DC source for the bleeder circuit and/or the output stage.

Optionally, a controller adjusts the regulation threshold.

Optionally, the end of the period is triggered by the AC mains supply voltage crossing a stop threshold.

Optionally, the controller comprises a first controller coupled with the power switch and a second controller coupled with the bleeder switch.

Optionally, the solid state light source comprises one or more light emitting diodes.

According to a fourth aspect of the disclosure there is provided an integrated circuit comprising:
an input stage;
an output stage suitable for coupling with a solid state
   light source;
a power stage including a power switch for selectively
   coupling the power stage with the output stage;
a bleeder circuit including a load and a bleeder switch for
   selectively coupling a load with the input stage; and
a controller arranged to:
enable on and off switching cycles of the power switch
   throughout the course of a period that starts at a point
   of an AC mains supply cycle as determined by a
   regulation threshold and ends when the when the phase
   cut dimmer switch disconnects the AC mains from the
   lamp, wherein
the regulation threshold is determined by feedback from
   one or more previous AC half cycles.

The integrated circuit may be provided as a driver for a solid state lamp, for connection to an AC mains supply via a trailing edge phase cut dimmer switch. The features of the lamp, lighting system and method described above may also be features of the integrated circuit.

BRIEF DESCRIPTION OF THE DRAWINGS

The disclosure will be described below, by way of example only, with reference to the accompanying drawings, in which:

FIG. 6 shows more details of operating waveforms of a lamp according to the present disclosure and as shown in FIG. 5c; and.

DETAILED DESCRIPTION

The present disclosure provides intelligent control of a lamp when coupled to a trailing edge dimmer in order to reduce power dissipation of a bleeder circuit.

Figure 5:
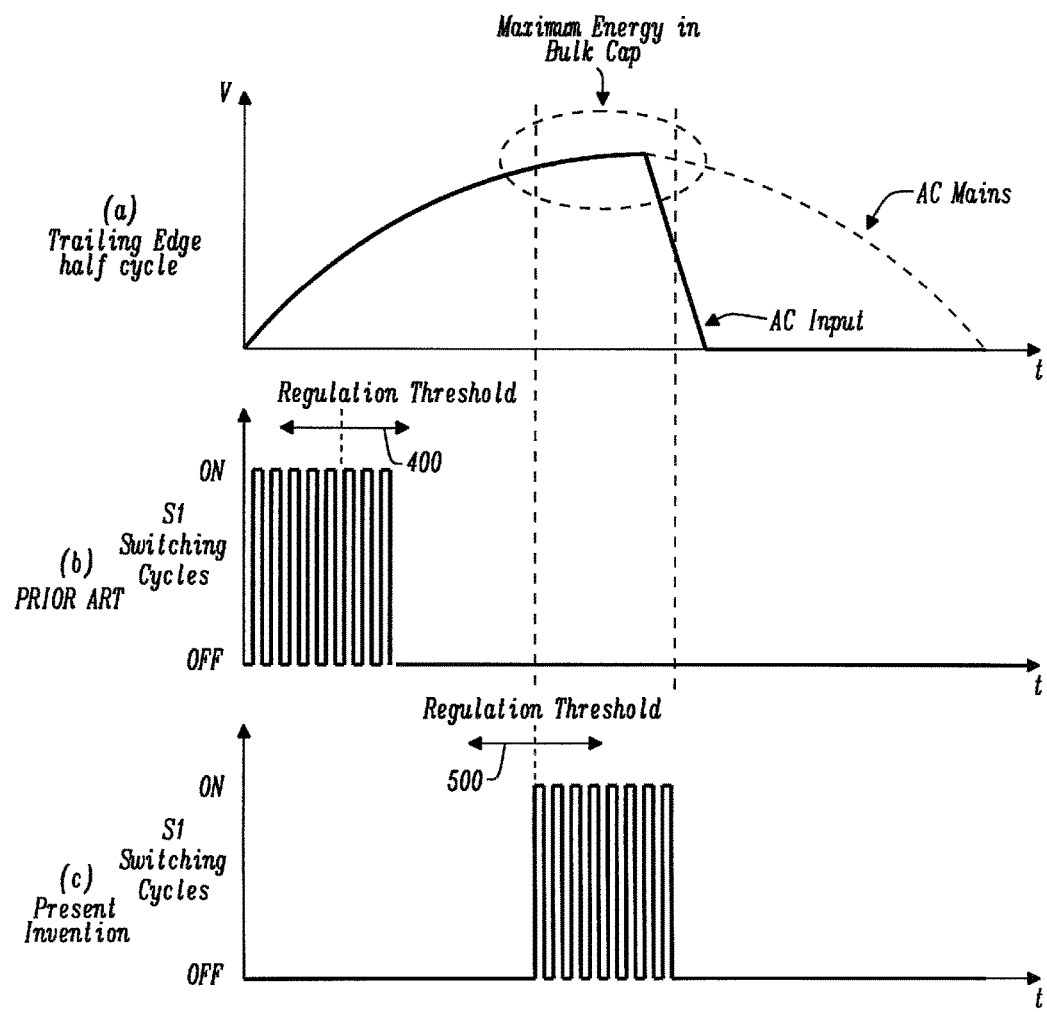
FIG. 5 shows operating waveforms of an LED based lamp, comparing typical operating waveforms with operating waveforms in accordance with the present disclosure.

FIG. 5 illustrates the operation of a lamp according to an embodiment of the disclosure, in which the on and off cycles of the power switch are enabled during a period when the energy in the bulk capacitor is at its highest levels. This results in a greater operational efficiency as compared with normal switching schemes for trailing edge dimmers.

Figure 4:
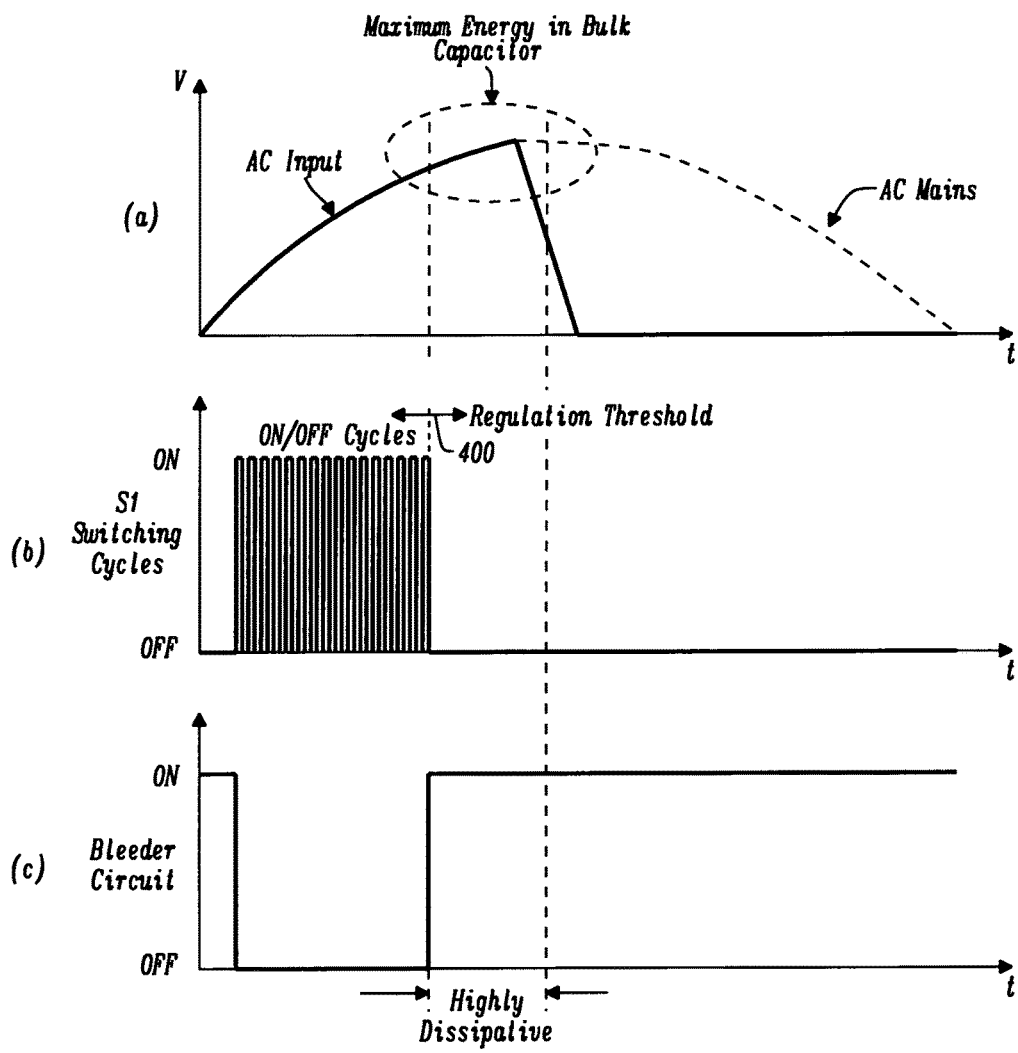
FIG. 4 prior art shows typical operating waveforms of the LED based lamp of FIG. 2 when coupled to a trailing edge phase cut dimmer switch.

FIG. 5a shows a plot of an AC input waveform over time from a typical trailing edge dimmer switch. FIG. 5b shows an existing control example (similar to that of FIG. 4b) where the switching cycles of the boost converter begin at or soon after the zero crossing of the AC mains signal. Output regulation can be achieved by adjusting when the switching cycles are stopped, as shown by the regulation threshold 400.

FIG. 5c shows an example of the present disclosure. Here, a regulation threshold 500 determines the start of the switching cycles within every half cycle of the AC input, in contrast to the technique of FIG. 5b, where the regulation threshold determines when the switching cycles are stopped.

Therefore, output regulation is maintained and power dissipated through the bleeder circuit is minimized.

The power switch S1 switching cycles are stopped when the dimmer disconnects the AC mains from the device. Because the voltage is faded smoothly by the trailing edge dimmer rather than being abruptly chopped, the power switch switching cycles may advantageously be stopped once the bulk voltage across C1 drops to or below a pre-set threshold, which may for example be chosen to be around one half of the peak AC mains voltage.

In a preferred embodiment, the placement of the regulation threshold 500 of one half cycle may be determined by the feedback signals received during a previous half cycle.

Figure 6:
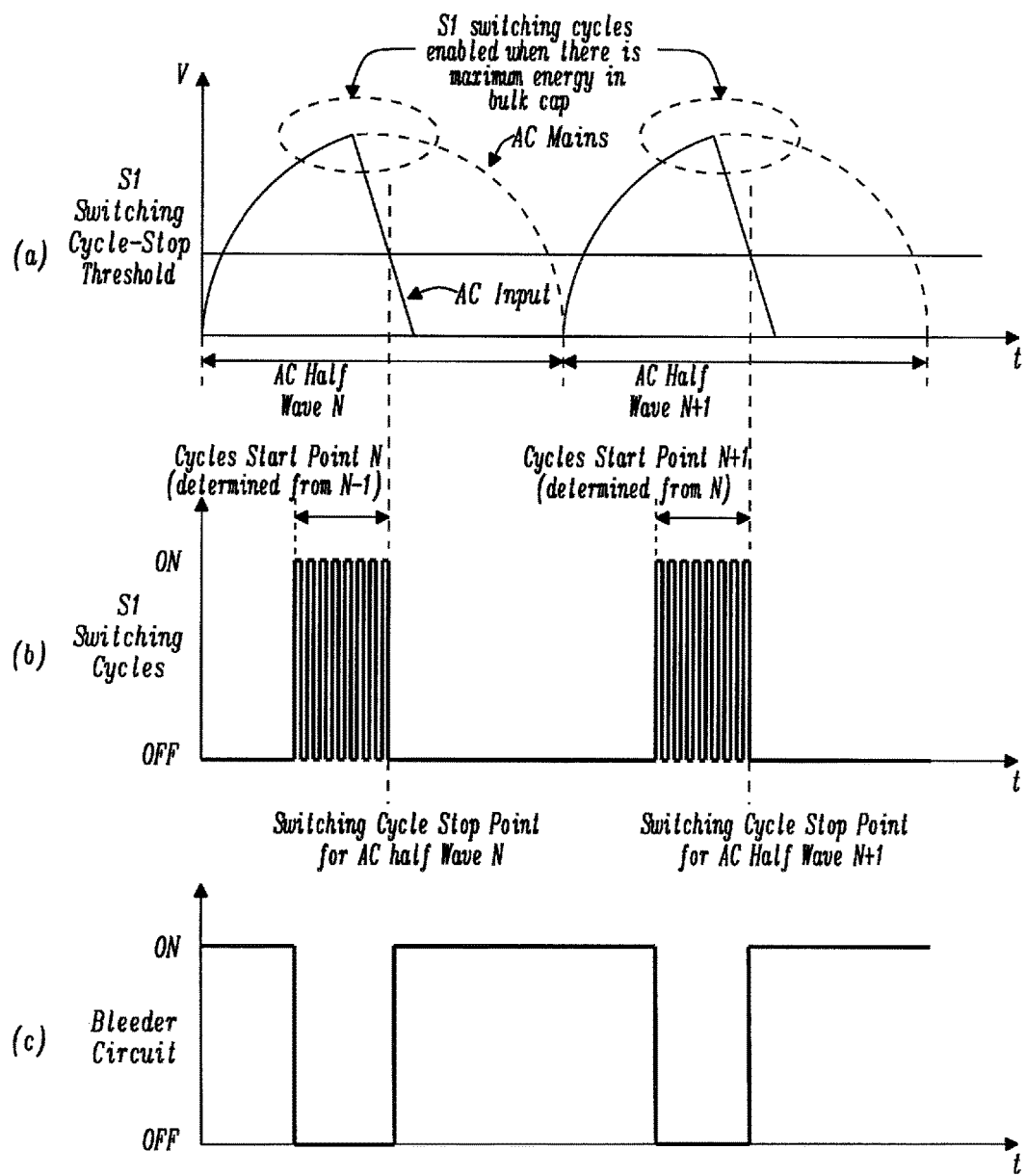

FIG. 6 shows more details of operating waveforms of a lamp according to the present disclosure and as shown in FIG. 5c. FIG. 6a shows the AC mains waveform (dotted line) over time superimposed on the phase cut AC input waveform (solid line). FIG. 6b shows the ON and OFF cycles of the power stage switch 51 as controlled by controller U1.

The bulk voltage V_bulk across the bulk capacitor is monitored and the on and off cycles of the power switch S1 are disabled once the voltage V_bulk falls to or below a switching cycle stop threshold 600.

Further, using feedback signals during the current AC half cycle, the controller U1 may determine if more or less energy needs to be provided to the output on the following AC half cycle in order to maintain output regulation. If less energy is required, the regulation threshold will be reduced, delaying the start of the switching cycles of the power switch Si for the next AC half cycle. If more energy is required to maintain output regulation, the power switch S1 switching cycles will begin earlier in the next AC half cycle. The feedback for a given AC half cycle may be provided by a previous AC half cycle or a plurality of previous AC half cycles, in which case the feedback may be based on trends or statistical measures such as a moving average of values from the plurality of half cycles.

The bleeder circuit is not enabled during periods when the energy in the bulk capacitor is at its maximum level, so the amount of dissipation is reduced compared with the normal control of a trailing edge dimmer switch.

Various improvements and modifications can be made to the above without departing from the scope of the present disclosure.

Figure 1:
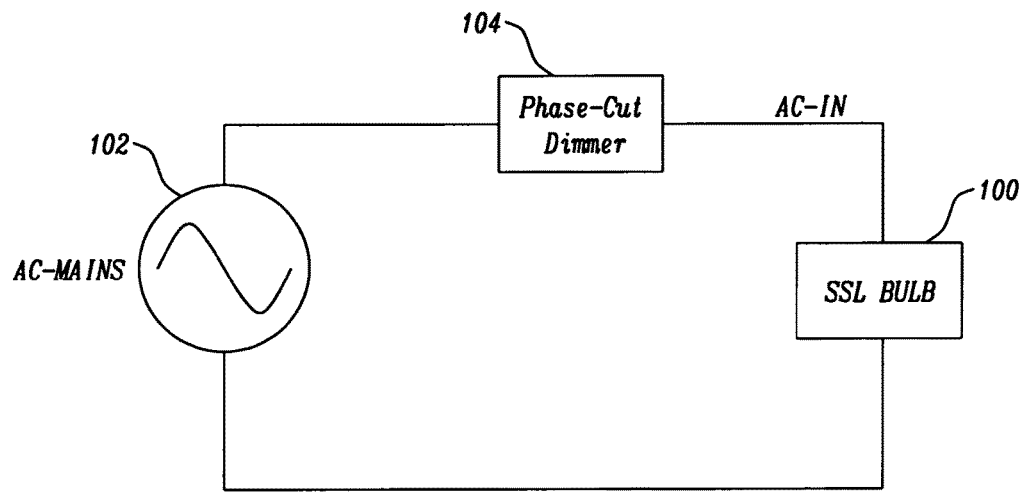
FIG. 1 prior art shows a solid state lighting system.
Figure 2:
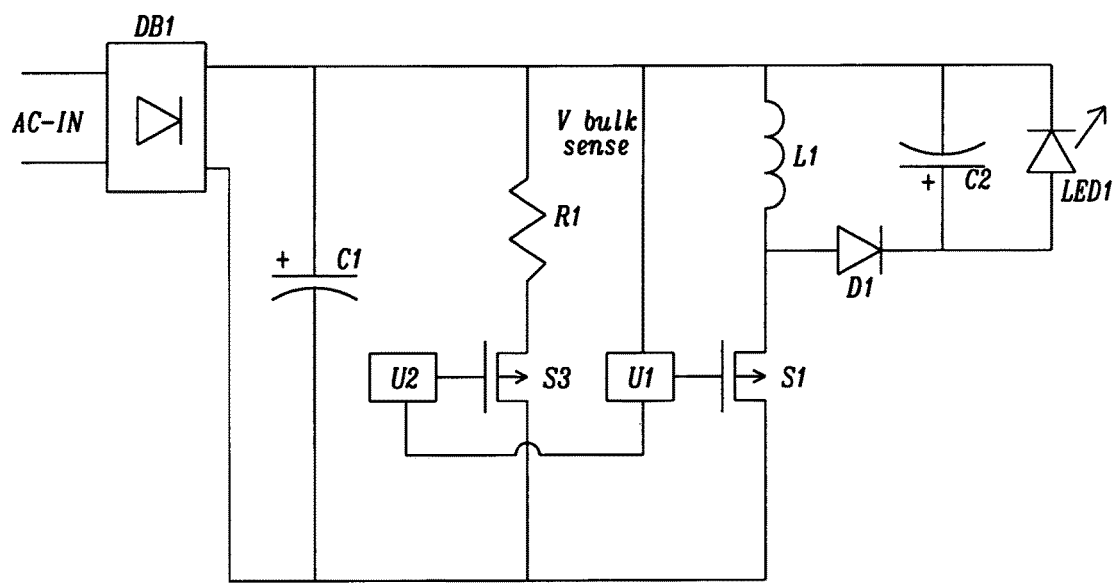
FIG. 2 prior art is a schematic diagram illustrating selected aspects of an LED-based lamp.
Figure 3:
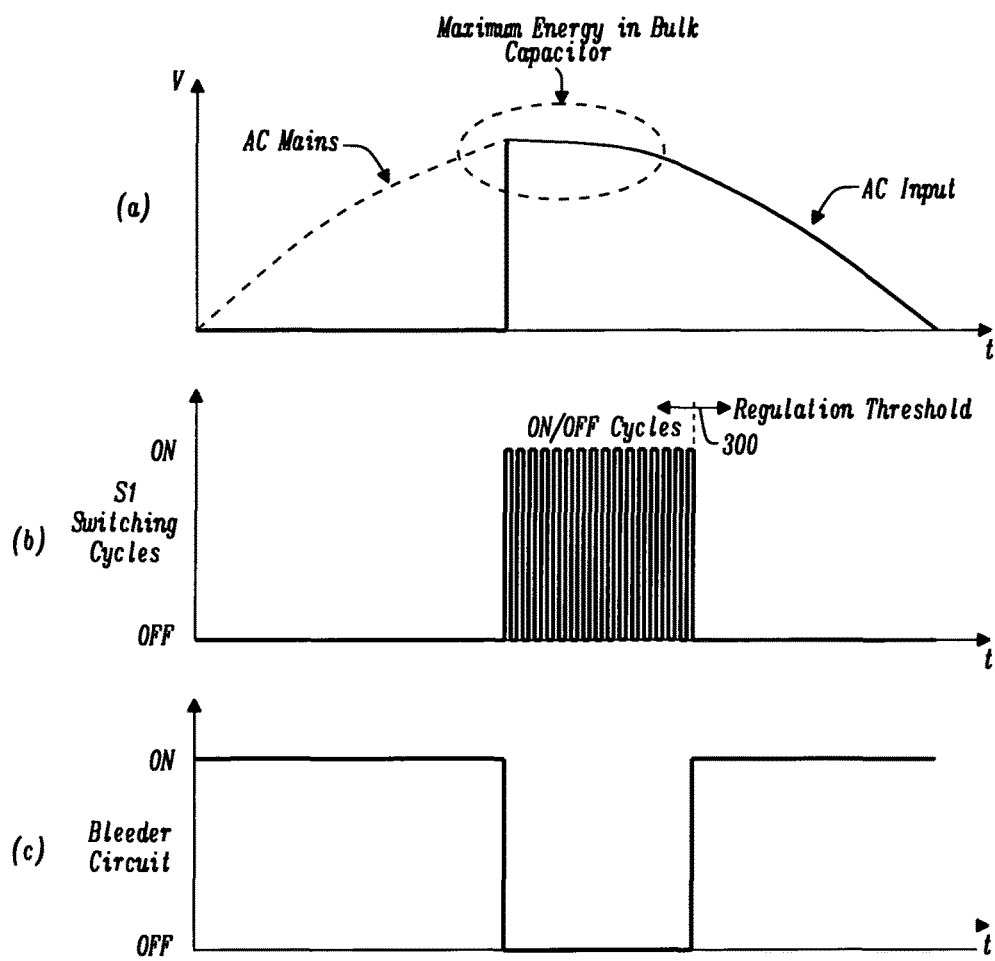
FIG. 3 prior art shows typical operating waveforms of the LED based lamp of FIG. 2 when coupled to a leading edge phase cut dimmer switch.
Figure 7:
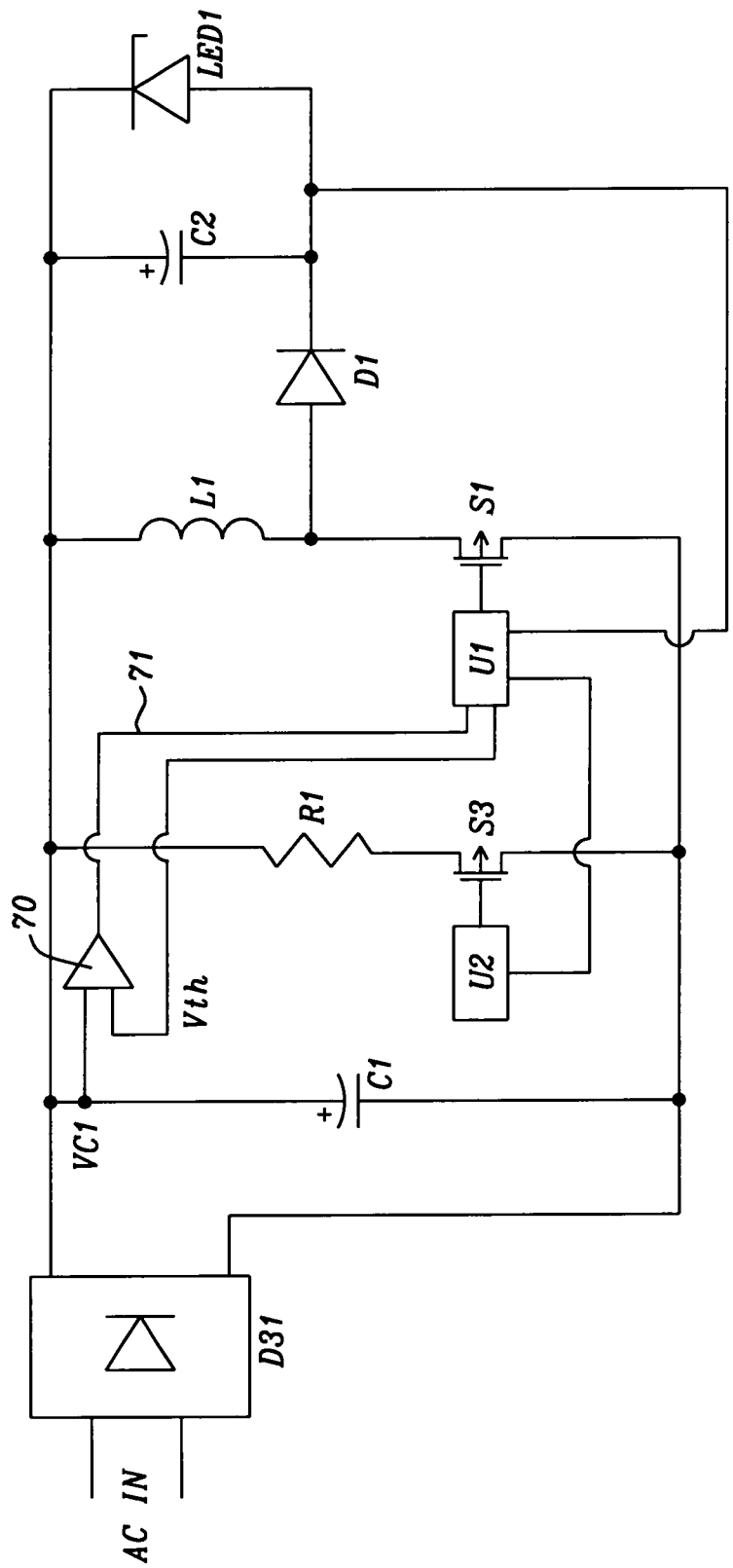
FIG. 7 shows a block diagram of the main components of the LED-based lamp invented.

FIG. 7 shows a block diagram of the main components of the LED-based lamp invented. Compared to the prior art FIG. 2 the block diagram of FIG. 7 now includes a comparator 70 having a first input connected to bulk capacitor CI (Voltage CI), a second input connected to the controller U1 (Voltage threshold Vth); and an output 71 connected back to the controller U1. The controller U1 is connected to the output of the converter, hence forming a feedback loop.

In use the comparator 70 compares the voltage of the bulk capacitor C1 with the voltage threshold Vth provided by the controller U1 based on the feedback signal. The comparator then outputs a signal to the controller U1 to start switching power switch S1 if the voltage across bulk capacitor Cl is above the threshold voltage Vth.

The invention claimed is:

1. A lamp for connection to an AC mains supply via a trailing edge phase cut dimmer switch and comprising:
   an input stage comprising a capacitor;
   an output stage including a solid state light source;
   a power stage including a power switch for selectively coupling the power stage with the output stage;
   a bleeder circuit including a load and a bleeder switch for selectively coupling a load with the input stage; and
   a controller arranged to:
   enable on and off switching cycles of the power switch throughout the course of a period that starts at a point of an AC mains supply cycle corresponding to a first energy level of the capacitor, as determined by a regulation threshold and ends at a point when the phase cut dimmer switch disconnects the AC mains from the lamp corresponding to a second energy level of the capacitor that is lower than the first energy level, wherein the regulation threshold is determined by feedback from one or more previous AC half cycles.

2. The lamp of claim 1, wherein the controller is further arranged to enable the bleeder switch to couple the load with the input stage when on and off switching cycles of the power switch are disabled.

3. The lamp of claim 1, wherein the input stage comprises a diode bridge and bulk capacitor providing an unregulated DC source.

4. The lamp of claim 1, wherein the regulation threshold is adjustable by the controller.

5. The lamp of claim 1, wherein the end of the period is triggered by the AC mains supply voltage crossing a stop threshold.

6. The lamp of claim 1, wherein the controller comprises a first controller coupled with the power switch and a second controller coupled with the bleeder switch.

7. The lamp of claim 1, wherein the solid state light source comprises one or more light emitting diodes.

8. A lighting system comprising a trailing edge phase cut dimmer and a lamp for connection to an AC mains supply via a trailing edge phase cut dimmer switch; said lamp comprising:
   an input stage comprising a capacitor;
   an output stage including a solid state light source;
   a power stage including a power switch for selectively coupling the power stage with the output stage;
   a bleeder circuit including a load and a bleeder switch for selectively coupling a load with the input stage; and
   a controller arranged to:
   enable on and off switching cycles of the power switch throughout the course of a period that starts at a point of an AC mains supply cycle corresponding to a first energy level of the capacitor, as determined by a regulation threshold and ends at a point when the phase cut dimmer switch disconnects the AC mains from the lamp corresponding to a second energy level of the capacitor that is lower than the first energy level, wherein the regulation threshold is determined by feedback from one or more previous AC half cycles.

9. A method of controlling a lamp comprising an input stage; an output stage including a solid state light source; a power stage including a power switch for selectively coupling the power stage with the output stage; a bleeder circuit including a load and a bleeder switch for selectively coupling a load with the input stage comprising a capacitor; said method comprising:

enabling on and off switching cycles of the power switch throughout the course of a period that starts at a point of an AC mains supply cycle corresponding to a first energy level of the capacitor, as determined by a regulation threshold and ends at a point when the phase cut dimmer switch disconnects the AC mains from the lamp corresponding to a second energy level of the capacitor that is lower than the first energy level; and determining the regulation threshold based on feedback from one or more previous AC half cycles.

10. The method of claim 9, further comprising enabling the bleeder switch to couple the load with the input stage comprising a capacitor when on and off switching cycles of the power switch are disabled.

11. The method of claim 9, wherein the input stage comprises a diode bridge and bulk capacitor and provides an unregulated DC source for the bleeder circuit and/or the output stage.

12. The method of claim 9, wherein a controller adjusts the regulation threshold.

13. The method of claim 12, wherein the controller comprises a first controller coupled with the power switch and a second controller coupled with the bleeder switch.

14. The method of any claim 9, wherein the end of the period is triggered by the AC mains supply voltage crossing a stop threshold.

15. The method of claim 9, wherein the solid state light source comprises one or more light emitting diodes.

16. An integrated circuit comprising:

an input stage;

an output stage suitable for coupling with a solid state light source;

a power stage including a power switch for selectively coupling the power stage with the output stage;

a bleeder circuit including a load and a bleeder switch for selectively coupling a load with the input stage; and a controller arranged to:

enable on and off switching cycles of the power switch throughout the course of a period that starts at a point of an AC mains supply cycle corresponding to a first energy level of the capacitor, as determined by a regulation threshold and ends at a point when the phase cut dimmer switch disconnects the AC mains from the lamp corresponding to a second energy level of the capacitor that is lower than the first energy level, wherein the regulation threshold is determined by feedback from one or more previous AC half cycles.

* * * * *